(12) United States Patent
Prasad Kantamneni et al.

(10) Patent No.: US 8,010,537 B2
(45) Date of Patent: Aug. 30, 2011

(54) SYSTEM AND METHOD FOR ASSISTING SEARCH REQUESTS WITH VERTICAL SUGGESTIONS

(75) Inventors: Raj Gopal Prasad Kantamneni, San Jose, CA (US); Ashley Hall, Menlo Park, CA (US); Tom Chi, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 378 days.

(21) Appl. No.: 12/199,138

(22) Filed: Aug. 27, 2008

(65) Prior Publication Data

US 2010/0057698 A1  Mar. 4, 2010

(51) Int. Cl.
*G06F 7/00* (2006.01)
*G06F 17/30* (2006.01)
(52) U.S. Cl. .................. 707/748; 707/751; 707/767
(58) Field of Classification Search .......... 707/708, 707/765, 767, 771, 721, 731, 748, 751, 753, 707/768
See application file for complete search history.

(56) References Cited

U.S. PATENT DOCUMENTS

| | | | |
|---|---|---|---|
| 6,704,727 | B1 | 3/2004 | Kravets |
| 7,548,915 | B2 * | 6/2009 | Ramer et al. ............... 705/14.54 |
| 7,664,744 | B2 * | 2/2010 | Guha ..................... 707/999.003 |
| 7,860,871 | B2 * | 12/2010 | Ramer et al. .................. 707/751 |
| 2006/0116986 | A1 | 6/2006 | Radcliffe |
| 2006/0122991 | A1 | 6/2006 | Chandrasekar et al. |
| 2007/0208724 | A1 | 9/2007 | Madhavan |
| 2007/0244862 | A1 * | 10/2007 | Adams et al. ..................... 707/3 |
| 2009/0043755 | A1 * | 2/2009 | Faris et al. ........................ 707/5 |
| 2009/0265317 | A1 * | 10/2009 | Buehrer et al. ................... 707/3 |

FOREIGN PATENT DOCUMENTS

WO   WO2010002770   3/2010

* cited by examiner

*Primary Examiner* — Don Wong
*Assistant Examiner* — Merilyn P Nguyen
(74) *Attorney, Agent, or Firm* — Seth H. Ostrow; Ostrow Kaufman LLP

(57) ABSTRACT

Systems, methods and computer program products are disclosed for assisting search request by presenting suggestion of one or more vertical segments to produce a more focused result. A vertical segment may be selected by the user, the selected vertical segment being associated with one or more query terms and a search is performed on an index associated with the vertical segment. A search engine generates a search result and returns a list of search result pages for presentation to a user.

17 Claims, 7 Drawing Sheets

SYSTEM AND METHOD FOR ASSISTING SEARCH REQUESTS WITH VERTICAL SUGGESTIONS

INCORPORATION BY REFERENCE

The present application is related to co-pending U.S. patent application Ser. No. 11/486,818, titled "QUERY CATEGORIZER" (filed on Jul. 14, 2006) and co-pending U.S. patent application Ser. No. 11/244,261, entitled "CUSTOMIZABLE ORDERING OF SEARCH RESULTS AND PREDICTIVE QUERY," (filed on Oct. 5, 2005), which are both hereby incorporated by reference in their entirety.

FIELD OF INVENTION

The invention disclosed herein relates generally to assisting users in formulating search requests through the presentation of suggested search verticals in an organized fashion. More specifically, the present invention is directed towards systems, methods and computer program products for assisting a user performing a search request by presenting suggestions of one or more verticals in a search interface and returning one or more search results for a selected vertical in an organized and categorized fashion.

BACKGROUND OF THE INVENTION

The Internet provides a large collection of interlinked content items in various formats, including documents, images, video and other media content. As the Internet has grown, the ability of users to search this collection and identify content items relevant or responsive to a given query has become increasingly difficult. The vast number of content items available on the Internet has led to frustration on the part of users attempting to locate information that is relevant to their informational needs. Accordingly, search engines have been developed to facilitate the information retrieval process.

A search engine processes and indexes content items available on the Internet. To find a desired or relevant content item, a user enters a query term or a set of query terms through a search interface. The search engine receives the query and searches an index for known content items that are associated with or otherwise match the term or terms. The search engine then identifies a set of content items that are relevant to the submitted query, returning the set to the user, a search result set. The search result set usually comprises a list, ranked by relevance, of one or more content items that are responsive to the query term or terms received.

The earliest search engines returned search results from a network, e.g. the Internet, without any regard to any specific categories into which those search results could fit. As search engines evolved, certain content categories, called "verticals," became recognized. Given a corpus of content, a "vertical" is a subset of content items that satisfy some criteria associated with one or more content items. For example, one vertical recognized by the Yahoo! Internet search engine is the "local" vertical, which consists of content associated with a given geographic area, such as New York, San Francisco, London, etc. Additionally, a vertical may comprise a corpus of related content items available from a third party data store, e.g. a web site hosting content items for a given topic The Yahoo! Internet search engine allows a user to specify, in addition to a set of query terms, a specific vertical in which the user would like to conduct a search for content. The verticals from which a user of the Yahoo! Internet search engine may select include, for example, "video," "images," "local," "shopping," "answers," "audio," "directory," "jobs," and "news." Verticals may also comprise, as indicated above, third party web sites not affiliated with a given search engine, such as Flickr, Upcoming, Yahoo Buzz, etc. The default search, conducted on an overall index, may return a large, unfocused set of content items or search results instead of a more responsive and focused search result from a specific vertical such as "local." A focused search result from a specific vertical may comprise data sets with an established structure (such as key value pairs, contact, location, information prices, images, etc.) and may be operative facilitate a comparison between individual results. A result set from a specific vertical is also helpful when the user knows the particular category of search results that is of interest. When the user knows the particular category ahead of time, the user may save time by conducting the search on the specific vertical instead of scouring the entire Internet.

Unfortunately, many users default to a search on an entire corpus of content items and are unaware of or have never performed a more focused "vertical" based search. This may be a result of the fact that finding the specific vertical that may contain the content items a user is looking for is not intuitive. Indeed, most users do not possess the technical awareness or even the time to determine if a specific vertical is more likely to return a responsive result set. Since users generally stop looking if the particular content item of interest is not returned within the first two search result sets, the more relevant and responsive content items on the Internet continue to remain hidden.

The process of searching for relevant content items on a network is therefore time consuming and complex. Accordingly, there exists a need for systems, methods and computer program products for presenting suggestions of vertical segments that are relevant to a query in an organized and categorized fashion.

SUMMARY OF THE INVENTION

The present invention is directed towards systems, methods and computer program products for assisting a search request through the suggestion of search verticals. The method according to one embodiment of the present invention comprises receiving a search request from a user, categorizing the input comprising the search request from the user, identifying one or more search corpora or vertical segments as containing responsive search result pages, suggesting for selection by the user the one or more search corpora or vertical segments, querying the selected vertical segment to return a responsive search results.

According to one embodiment, the invention comprises a method for assisting a user in formulating a search request through a presentation of one or more suggested search vertical segments. The method according to this embodiment comprises retrieving one or more terms or phrases comprising a query and analyzing the one or more terms or phrases to generate one or more suggested search vertical segments. A given suggested search vertical segment is selected from the one or more suggested search vertical segments and a search result is displayed to the user on the basis of the query and the given suggested search vertical segment. According to another embodiment, the method is stored on computer readable media as program code for execution by a programmable processor.

Analyzing may comprise utilizing a query category module to determine one or more categories for the one or more terms or phrases and the method may comprise dynamically presenting the one or more suggested search vertical segments within a search interface in response to receipt of input from the user. According to one embodiment, selecting the given suggested search vertical segment comprises associating the given suggested search vertical segment with the one or more terms or phrases. Furthermore, retrieving the one or more terms or phrases comprising the query may comprises receiving additional input from the user as the user types and analyzing the input to generate one or more additional suggested search vertical segments.

Embodiments of the invention are also directed towards a system for assisting a user in formulating a search request through presenting one or more suggested search vertical segments. The system according to this embodiment comprises a search engine operative to retrieve one or more terms or phrases comprising a query, a category module operative to analyze the one or more terms or phrases and a vertical suggestion generator operative to generate one or more suggested search vertical segments on the basis of an analysis performed on the one or more terms or phrases. The system also comprises a search interface operative to allow the user to select a given suggested search vertical segment from the one or more suggested search vertical segments and display a result to the user on the basis of the query and the given suggested search vertical segment. The search interface may be operative to dynamically present the one or more suggested search vertical segments in response to receipt of input from the user.

In addition to the foregoing, the category module may also determine one or more categories on the basis of the one or more terms or phrases and the search engine may be further operative to associate the given suggested search vertical segment with the one or more terms or phrases. Furthermore, the search engine may be operative to receive additional input as the user types and the vertical suggestion generator may be operative to generate one ore more additional suggested search vertical segments.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
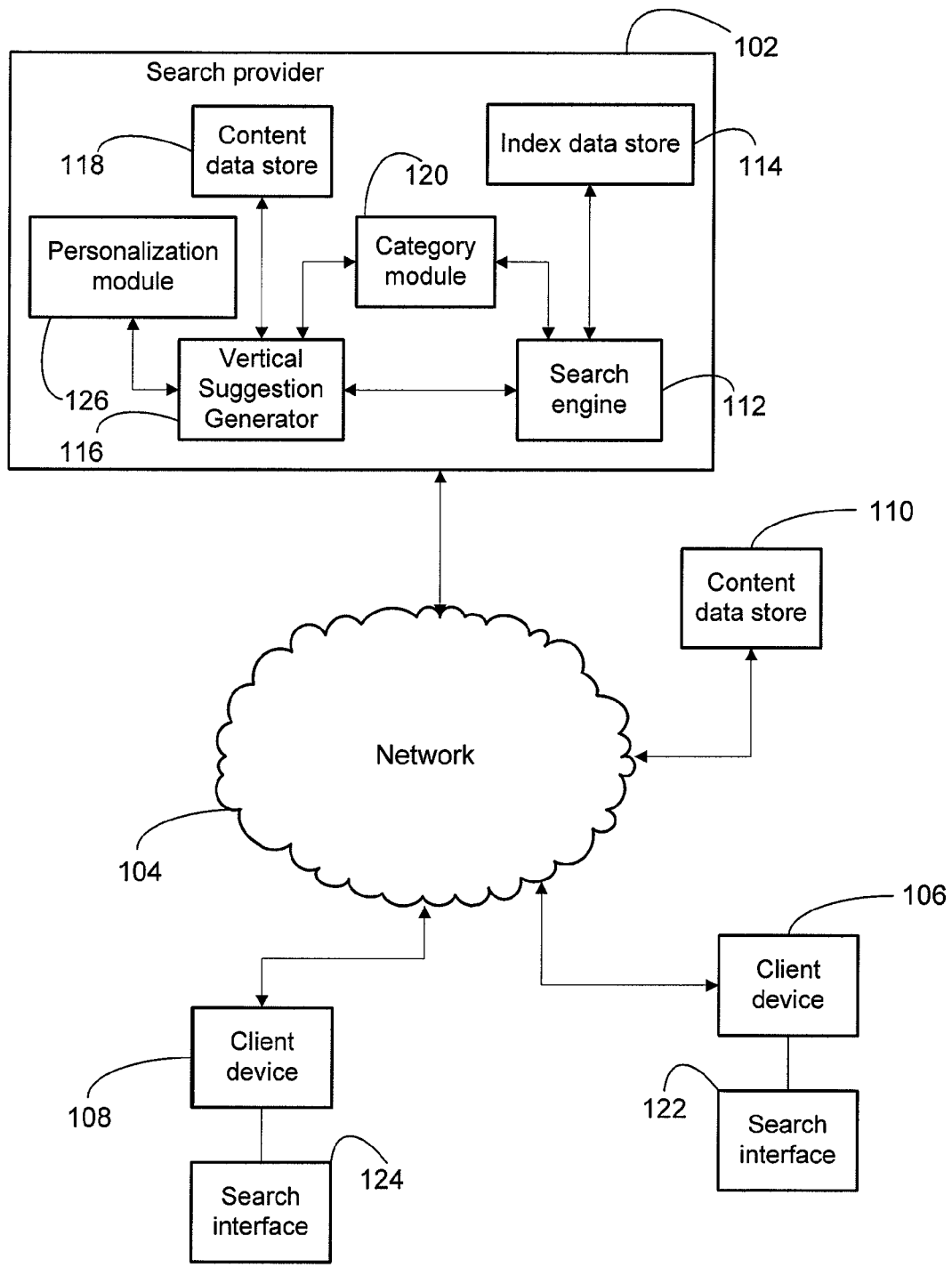
FIG. 1 presents a block diagram illustrating a system for suggesting search verticals in response to a search request received from a user according to one embodiment of the present invention.

FIG. 1 presents a block diagram depicting a system for suggesting search verticals in response to a search request received from a user according to one embodiment of the present invention. As depicted in FIG. 1, a search provider 102 may comprise a content data store 118, an index data store 114, a search engine 112, a category module 120 and a vertical suggestion generator 116. According to the embodiment illustrated in FIG. 1, the search provider 102 may be communicatively coupled to a network 104, such as the Internet, which may include a connection to a content data store 110, one 106 or more 108 client devices, as well as other network resources.

In the embodiment illustrated in FIG. 1, a search provider 102 comprises a search engine 112 operative to receive search requests from client devices and, in response, return a search result that is responsive to the incoming search request. The search provider 102 may operable to search for one or more items of content in a content data store 118. A given content data store 110 and 118 may be an accessible memory structure such as a database, CD-ROM, tape, digital storage library, etc. Content data stores 110 and 118 may be implemented as databases, file systems, or any other type of storage structures capable of providing for the retrieval and storage of a variety of data types. Content data stores 110 and 118 may also be communicatively coupled to a search engine 112 running on a search provider for receiving requests or queries for content and providing a variety of content items in response to such requests. In other embodiments, the content data store may comprise a plurality of content data stores.

The search provider 102 may comprise one or more search engines. The search engine 112 may be communicatively coupled to an index data store 114. An index, for example a word-location index, may comprise a listing of documents, a listing of web pages, a listing of URLs, etc. In one embodiment, the index data store 114 may maintain one or more indices. In an alternative embodiment, the index data store may comprise a plurality of categorized indices.

According to the embodiment that FIG. 1 illustrates, one or more client devices 106 and 108 may be communicatively coupled to a network 104, which may include a connection to one or more local or wide area networks, such as the Internet. A client device may be a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, smartphones, hand held devices, set top terminals, mobile handsets, PDAs, etc.

A user at a given client device 106 wishing to locate a particular content item submits a search request to the search engine 112 at the search provider 102. The search request from the given client device 106 may take the form of a query comprising one or more search terms or phrases. For example, the query "laptop computer" is a two term query; the query "ultra-portable laptop computer" is a three term query, etc.

According to one embodiment, the search engine 112 may receive the three term query mentioned above. As the user types, the search engine 112 categorizes the terms in the query across an index of vertical segments which may be stored in the index data store. For a given query, the vertical segments may then be ranked according to relevance. Once the vertical segments are ranked, the vertical suggestion generator 116 may present suggestions to the user. To determine a given vertical segment to present, the vertical suggestion generator 116 may traverse a given index associated with a given vertical segment for content items that may be responsive to a search request. In an alternative embodiment, the vertical suggestion generator 116 may use the query category in traversing an index of vertical segments to determine which vertical segments to suggest. Accordingly, vertical suggestion generator 116 may locate or otherwise identify a set of vertical segments that may contain one or more content items that fall within the scope of the search request.

In addition to the foregoing, the vertical suggestion generator 116 may be in communication with and receive input from a personalization module 126. The personalization module 126 may provide user specific information to the vertical suggestion module 116 for use in suggesting one or more vertical search segments. User specific information may include, but is not limited to, IP address, geographic location, age, sex, marital status, past browsing behavior, other online activity of the user, etc. For example, assume that the past online activity of the user indicates that when the user types a query that falls within the category "shopping," he or she typically selects results from the site shopping.yahoo.com. Accordingly, when the user subsequently provides a query falling within the category "shopping," the personalization module 126 (which may observer or otherwise record user behavior) may instruct the vertical suggestion module 116 to provide search results from the vertical shopping.yahoo.com for the query. Alternatively, or in conjunction with the foregoing, the user may directly navigate to a given vertical by employing the search syntax that the vertical suggestion generator 116 formulates in conjunction with the personalization module 126.

Vertical suggestions may also be presented and updated as the user types into a search control through a search interface 122 and 124. The presentation of suggested of vertical segments may take the form of images, text, links, checkboxes, dynamic fields, or other user interface objects that are apparent those of ordinary skill in the art. According to one embodiment of the present invention, a vertical segment is a graphic representation of the specific vertical segment, which conveys the relevance of the vertical segment to the user. For example, a relevant vertical segment may be presented to a user through the search interface, 122 and 124, as a bold red hyperlink while a less relevant vertical segment may be presented in a regular font style as a blue hyperlink. While this example embraces the intuitive hot and cold metaphor, other embodiments may use a variety of metaphors that will be apparent to those having skill in the art.

According to various embodiments of the present invention, the search interface 122 and 124 may be operative to present a result upon selection of a suggested vertical segment by the user. The result that the search interface 122 and 124 displays may take different forms in accordance with different embodiments of the invention including, but not limited to, a specific landing page in a given website, results from a given web site, results from one or more verticals, results from one or more verticals in conjunction with web search results, etc., including combinations thereof. A user may activate or deactivate the output of the personalization module 126, as well as activate or deactivate the vertical suggestion module 116, which a user may accomplish by selecting a control (e.g., a checkbox or radio button) on a search interface 122 and 124 at the client device 108. Similarly, a user may set the specific parameters that influence the form or manner in which the search interface 122 and 124 displays the result, as is described herein in greater detail.

According to one embodiment, the vertical suggestion generator 116 may present suggestions of vertical segments based on the ranking of one or more vertical segments. In some embodiments, the vertical segments with the most relevant content items may be suggested to the user. Ranking vertical segments may be accomplished in three steps according to one embodiment. First, a conditional probability is performed on each vertical segment using the frequency numbers of the top two query suggestions. Frequency numbers of query suggestions may be determined by counting the number of times the search engine receives a given query term or combination of terms. In other embodiments, the frequency may be determined by counting the number of times a search engine receives a pair of query terms. In yet another embodiment, the frequency of the numbers may be filtered by various parameters including, but not limited to, temporal parameters, demographic parameters, and/or language parameters.

One embodiment of a method for obtaining the top two query suggestions is described in co-pending U.S. patent application Ser. No. 11/881,503, entitled "QUERY CATEGORIZER," previously incorporated by reference. Second, the click-through rates for a categorized query within a specific vertical segment over a period of time are determined. Finally, a function combining the conditional probability determined in the first step and the click-through rates determined in the second step may be used to determine the relevance, or ranking of vertical segments. In an alternative embodiment, the vertical segments may be ranked according to the conditional probability described in the first step. In yet another embodiment, the relevance of a given vertical segment may be accomplished by counting the click-through rates as described in the second step.

The category module 120 may categorize a given query using one or more techniques known to those of skill in the art. For example, the category module 120 may implement one or more clustering algorithms to determine a category to which a given query belongs including, but not limited to, a K-means algorithm, a Fuzzy C-means algorithm, a hierarchical clustering algorithm, etc. The category module 120 may also utilize other clustering and categorization algorithms known to those of skill in the art.

Alternatively, or in conjunction with clustering, the category module 120 may utilize one or more categorization or classification algorithms known to those of skill in the art. Classification concerns the gathering of training data (e.g., query categories or search terms) with regard to a given vertical (e.g., local) and learning a function from the training data that, when given a query category/vertical segment pair, is operative to return a probability score that denotes how closely the query category relates to the vertical segment. According to one embodiment, the function is used to group results into categories in linear computation time, which results in faster and more accurate query categorization.

Figure 2:
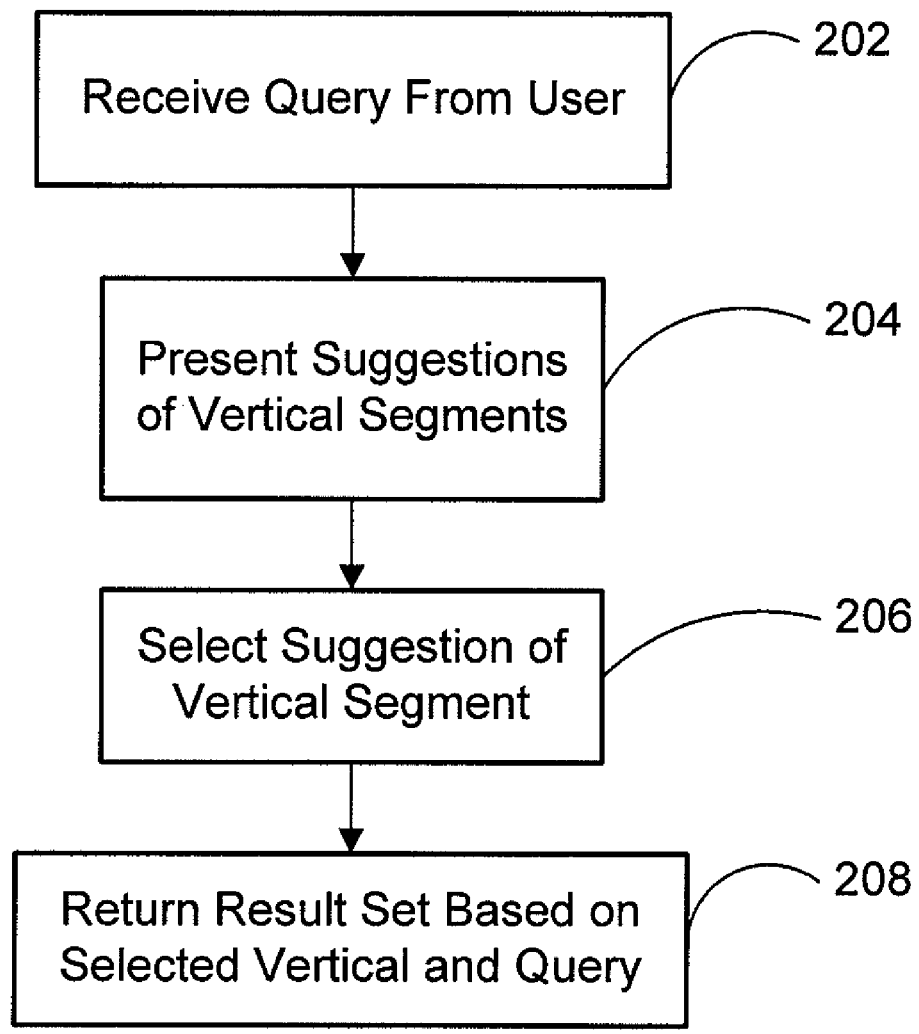
FIG. 2 presents a flow diagram illustrating a general overview of a method for presenting suggestions of vertical segments in a search interface according to one embodiment of the present invention.

FIG. 2 is a flow diagram illustrating a general overview for a method of presenting suggestions of vertical segments in a search interface according to one embodiment of the present invention. According to the embodiment illustrated in FIG. 2, the search engine receives a query from a user, step 202. The search engine may then use the query in presenting suggestions of vertical segments, step 204. Vertical segments may include, but are not limited to, the following categories: web, images, video, audio, news, shopping, directory, reference, local, hotjobs, travel, finance, movies, television, automobiles, health, sports, etc.

With the vertical segments presented to the user, the user may select a given vertical segment to search through, step 206. For example, if the vertical segment "local" is presented to the user in the form of a hyperlink, the user may select the "local" vertical by clicking on the hyperlink. The step of selecting a suggestion instructs the search engine to restrict its search to the selected vertical segment, e.g. "local." This may be accomplished by associating a unique index with a given vertical segment in the index data store. In other words, when the user selects a specific vertical segment, the search engine may return a result by traversing the unique index associated with the selected vertical for the query term or term submitted by the user, step 208. For example, if the user entered a query for "olive garden" and then selected the vertical segment "local", the search engine would return a result comprising content items matching the query terms "olive garden" found in the index associated with the "local" vertical segment. In an alternative embodiment, a search request may be limited to a vertical segment by traversing an index of content items, where the content items are associated with a vertical segment through tagging or some form of annotation apparent to those having skill in the art.

Figure 3:
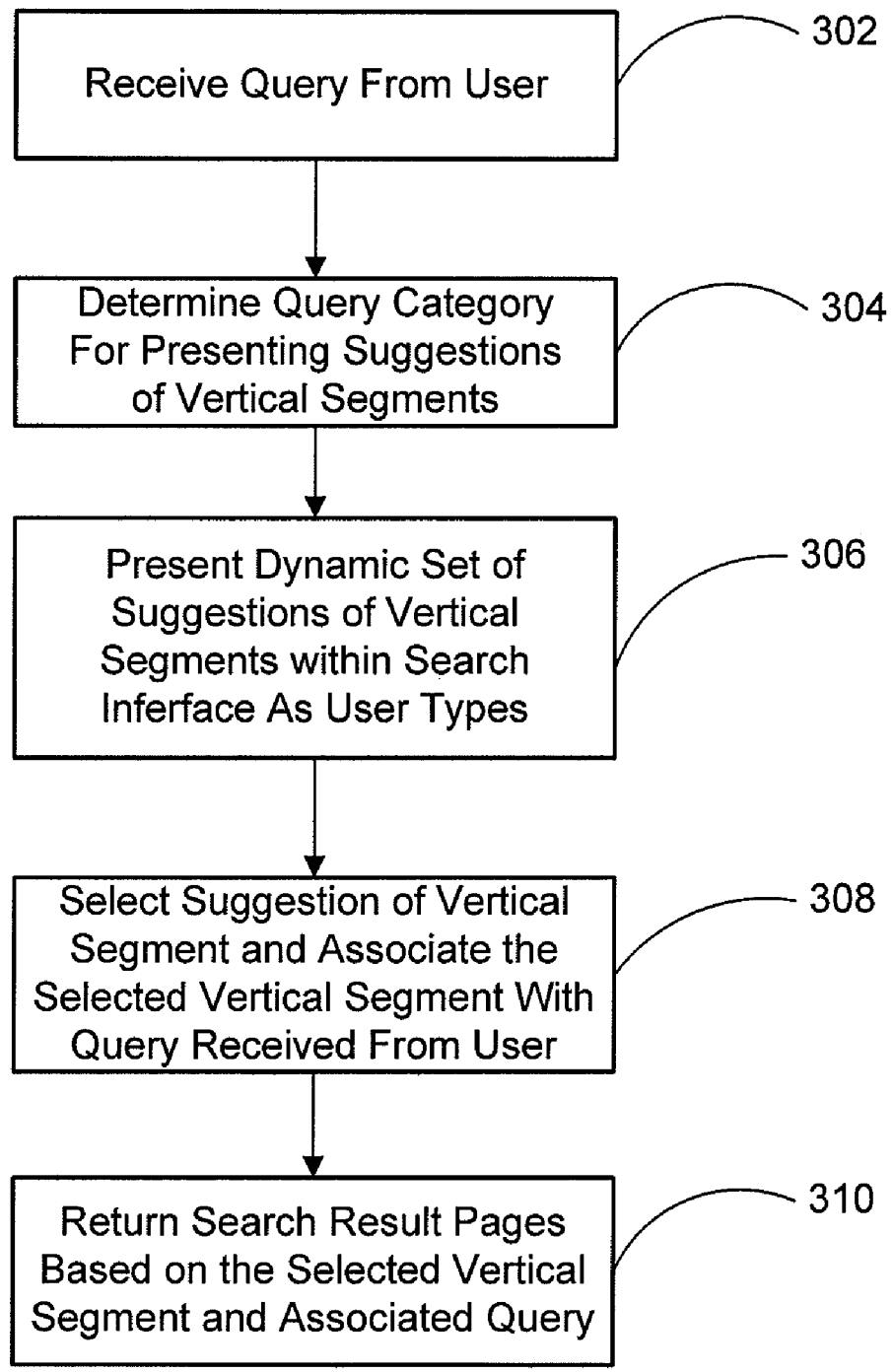
FIG. 3 presents a flow diagram illustrating a method for returning a result on the basis of a selected vertical segment and a search request from a user according to one embodiment of the present invention.

FIG. 3 presents a flow diagram illustrating a method for returning a result on the basis of a selected vertical segment and a search request from a user according to one embodiment of the present invention. According to FIG. 3, the search engine receives a query from a user, step 302, and may then determine a query category for presenting suggestions of vertical segments, step 304.

According to one embodiment, the search engine may use a category module to determine a query category for presenting suggestions of vertical segments for a given query, step 304. One embodiment of categorizing queries is described in U.S. patent application Ser. No. 11/881,503, entitled "QUERY CATEGORIZER," filed on Jul. 26, 2007, previously incorporated by reference. The search provider may then dynamically present one or more suggestions of vertical segments that may contain a responsive result for a given query, step 306.

The search engine may present a dynamic set of suggestions of vertical segments within the search interface as the user types, step 306. In one embodiment, the user enters a query term into a search box, the query term is categorized, and then the categorized query is used to present a dynamic set of suggestions of vertical segments. The set of suggestions is dynamic in the sense that it may change if the user determines the query term entered is mistyped or decides to try a new term. In other words, suggesting vertical segments is not contingent on the user's submission of the query. Embodiments of the invention also contemplate the incorporation query disambiguation as the user types. Systems and methods for query disambiguation are known to those of skill in the art. According to one embodiment, query disambiguation utilizes user specific information output from a personalization module to provide disambiguation that is specific to a given user.

Instead, the embodiment illustrated in FIG. 3 receives user input to predict the query term and determine the query category as the user types. A query term may be predicted using a variety of auto-complete modules well known to a person having skill in the art. One embodiment for the auto-complete module or method of predicting a query is described in co-pending U.S. patent application Ser. No. 11/244,261, entitled "CUSTOMIZABLE ORDERING OF SEARCH RESULTS AND PREDICTIVE QUERY", previously incorporated by reference.

In one embodiment, the search engine uses the predicted query or query term to determine which vertical segment to suggest. The predicted query term may be cross referenced against a table in database or an index in an index data store to determine the associations with one or more vertical segments. According to one embodiment, the relevancy of a vertical segment may be determined by mining the historical data captured from a given user over a period of time. When one or more relevant vertical segments are identified, they may be presented to the user as suggestions.

The user may select from among one or more suggestions of vertical segments, step 308. When a user selects a given vertical segment, the search engine may restrict the search to content items within the selected vertical segment. For example, for the given query "olive garden" in the selected vertical "local," the search engine may run the "olive garden" query on the "local" vertical, which may be stored as a "local" index in the index data store. Based on the selected vertical and associated query, the user may submit the query and the search engine may then return a set of links of search result pages, step 310. According to one embodiment, these pages may be listed in order of relevance and may be filtered by various parameters, such as distance, rating, review, etc. Other embodiments may use additional filtering parameters that are apparent to those having ordinary skill in the art. The result that the search engine returns may take different forms in accordance with different embodiments of the invention including, but not limited to, a specific landing page in a given website, results from a given web site, results from one or more verticals, results from one or more verticals in conjunction with web search results, etc., including combinations thereof.

Figure 4:
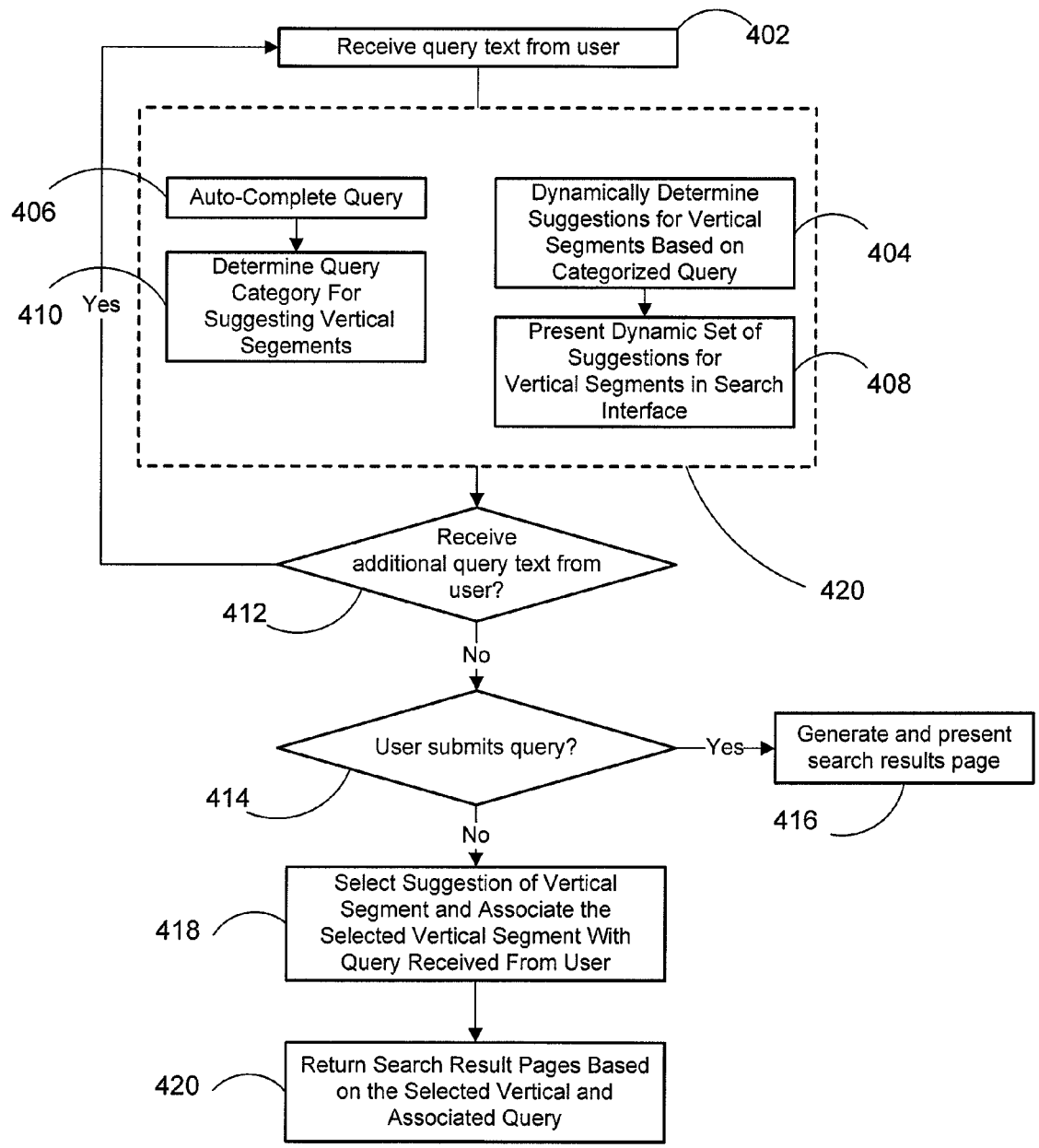
FIG. 4 presents a flow diagram illustrating a method for dynamically determining suggestions for vertical segments on the basis of input received as the user types a search query according to one embodiment of the present invention.

FIG. 4 is a flow diagram illustrating a method for dynamically determining suggestions of vertical segments on the basis of input received as the user types a search query according to one embodiment of the present invention. According to the embodiment illustrated in FIG. 4, the search engine may receive a query text from a user, step 402. As input from the user is received, the embodiment illustrated in FIG. 4 may employ the technique of parallel processing 420. In one embodiment, the 406 auto-complete and 404 determining suggestions for vertical segments processes may be divided among one or more processors, step 404.

As shown in embodiment illustrated in FIG. 4, there is a prompt to determine whether additional query text has been received from the user, step 412. If additional query text is received, the additional text may form a new query and be resubmitted to determine the query category and vertical segment in light of the additional text. According to the embodiment illustrated in FIG. 4, after auto-complete finishes, step 406, the query category may be determined, step 410.

According to the embodiment illustrated in FIG. 4, the user may submit the query without selecting one of the suggested vertical segments, step 414. If none of the suggested vertical segments are selected, the search engine may then generate and present a search result page with a set of the search results retrieved, step 416, usually from a general index of the Internet as a whole. If the user selects one of the suggested vertical segments, step 418, the search engine may associate the selected vertical segment with the query received from the user. According to one embodiment, this selection may involve narrowing the search to an index that is associated with the selected vertical segment. The search engine may then run the query on the selected vertical and return a set of search result pages based on the selected vertical and associated query, step 420.

In an alternative embodiment, the selection of a vertical segment may result in the suggestion of sub-verticals. Returning back to the example of the "local" vertical, the "local" vertical may be defaulted to the state listed in a user's profile, for example New York. Sub-verticals of the New York "local" vertical may include, but are not limited to, major metropolitan areas such as Manhattan, Albany, Rochester, Ithaca and Syracuse. In other embodiments, the determination of the "local" vertical and corresponding sub-verticals is based on the various algorithms for geo-targeting one or more IP addresses that are apparent to those having skill in the art.

Figure 5:
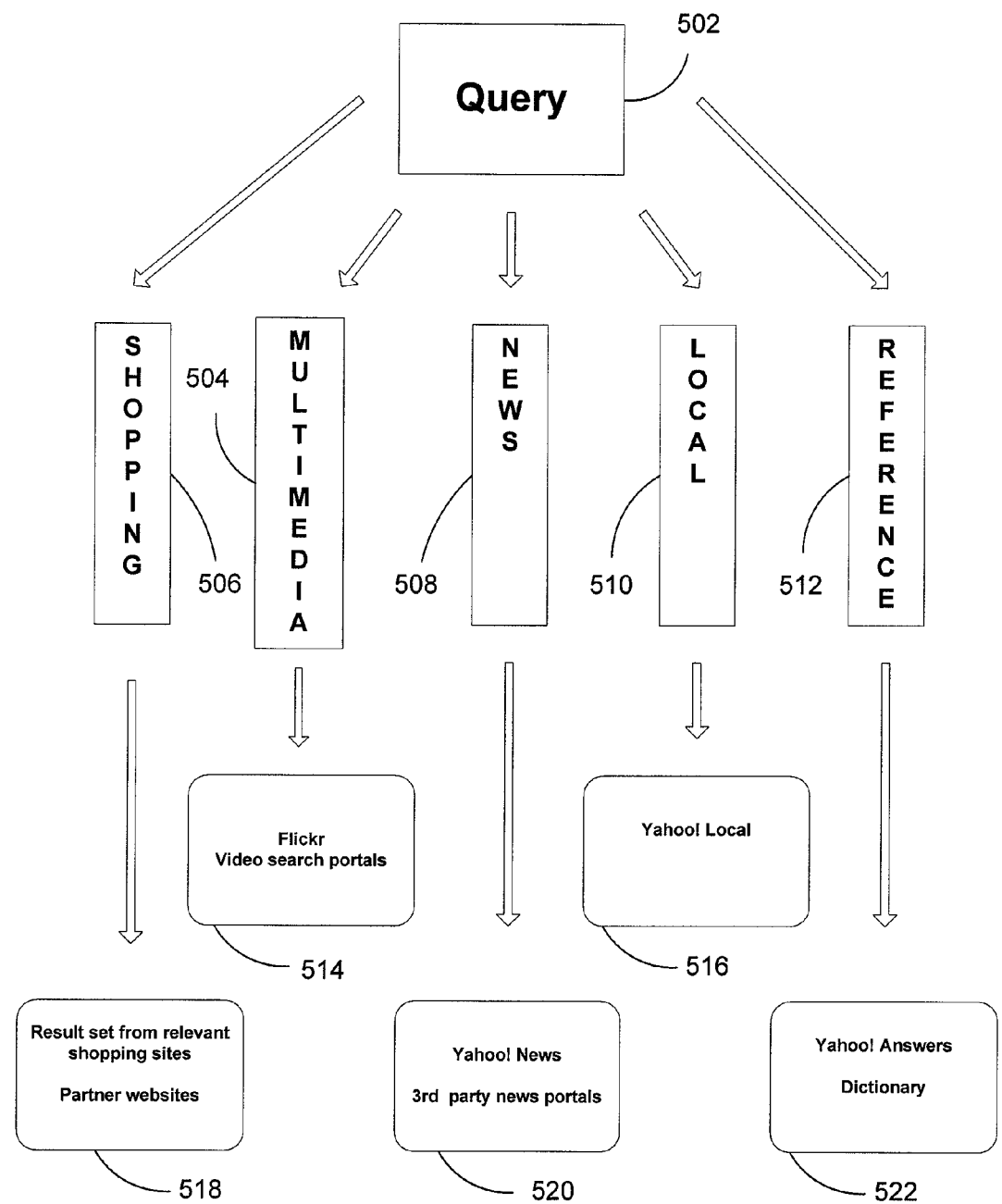
FIG. 5 presents a flow diagram illustrating a path a query may take in retrieving a search result for displaying on a search results page according to one embodiment of the present invention.

FIG. 5 is a flow diagram illustrating a path a query may take in retrieving a search result for displaying on a search results page according to one embodiment of the present invention. As shown in FIG. 5, a query 502 may run on one or more vertical segments. In one embodiment, the vertical segments may include a shopping vertical 506, a multimedia vertical 504, a news vertical 508, a local vertical 510 and a reference vertical 512.

Other embodiments may also present a set of persistent verticals. A persistent vertical may be a vertical that is commonly or frequently used by a user, or in an alternative embodiment, a community. The set of persistent vertical segments may be based on historical search data for a given user. Through the use of a user's historical data, the persistent vertical segments may include a user's most frequently visited vertical segment. For example, a user that primarily uses the Internet for online shopping may have the shopping vertical appear as a persistent vertical. In an alternative embodiment, a community-based history may be used to determine the set of persistent vertical that may be presented. For example, a community-based history may include the historical data from the entire user-base of the Yahoo! search portal.

Vertical segments may be further broken down into sub-verticals. Sub-verticals may also be community-based or user-based. For example, if a specific user is loyal to a specific brand or online retailer, the presentation of a sub-vertical may reflect that proclivity. Likewise, the historical data for online communities or groups may be collected an analyzed in determining the appropriate sub-vertical to present to the members of a given online community or group.

As illustrated in the embodiment of FIG. 5, the vertical segments may comprise one or more indices from various sources. According to one embodiment, the shopping vertical 506 may comprise 518 a relevant shopping site and websites that partner with a given search engine. The multimedia vertical 504 may comprise 514 the online photo website Flickr and one or more video search portals. The news vertical 508 may comprise 520 Yahoo! News and one or more 3rd party news portals. The local vertical 510 may comprise 516 Yahoo! local. The reference vertical 512 may comprise 522 Yahoo! answers and an online dictionary.

Figure 6:
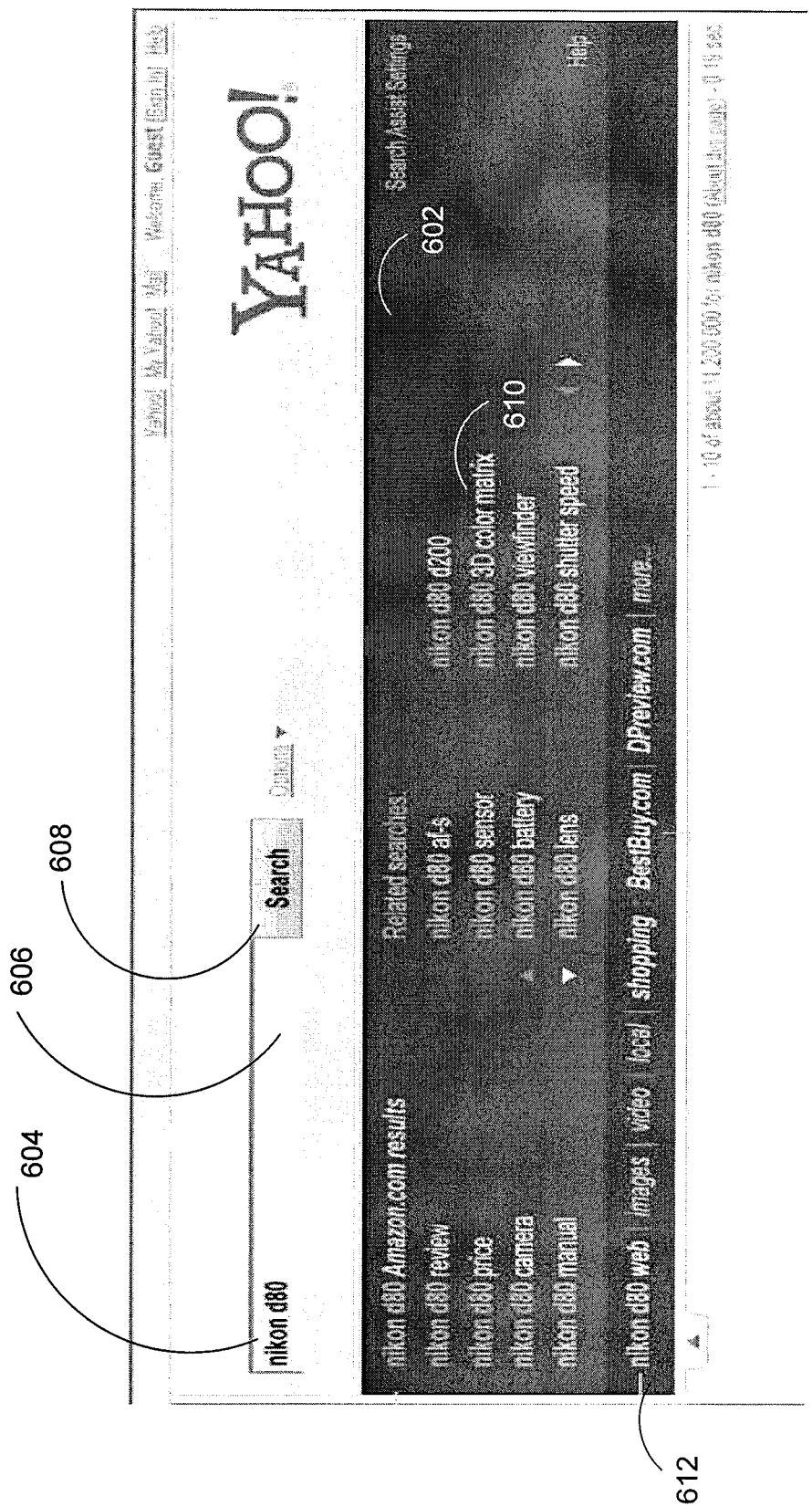
FIG. 6 is a screen diagram illustrating a search interface component for presenting suggestions for vertical segments to the user according to one embodiment of the present invention.

FIG. 6 is a screen diagram illustrating a search interface component for presenting suggested vertical segments to a user according to one embodiment of the present invention. According to the screen diagram of FIG. 6, a user interacting with a search provider may retrieve a user interface for initiating a search of content items stored on a content data store and indexed in an index data store maintained by the search provider. A search box 606 may receive input from a user as query text 604. As the search box receives input from a user, an interactive search interface component 602 may appear to the user. As the user types, the interactive search interface component may suggest additional query terms 610 and present suggestions for vertical segments 612. The suggested vertical segments 612 may be presented to a user with a distinct visual style, such as bold font type and an italic font style. When the user finishes entering a query, the user may then submit the query to the search engine for processing by clicking on the search button 608. The user may also select a suggested vertical segment.

In alternative embodiments, the visual style applied to a given vertical segment may be implemented as an intuitive graphic representation for the given vertical. For example, the "images" vertical may be presented to the user as a camera icon while the "shopping" vertical may be presented to the user as a shopping cart icon. In other embodiments, the graphic representation may be presented using various data visualization techniques that are apparent to those of skill in the art. For example, a data visualization technique may extend the graphic representation of a given vertical segment by visually indicating the relevance of a given vertical segment to a given query term entered by the user.

Figure 7:
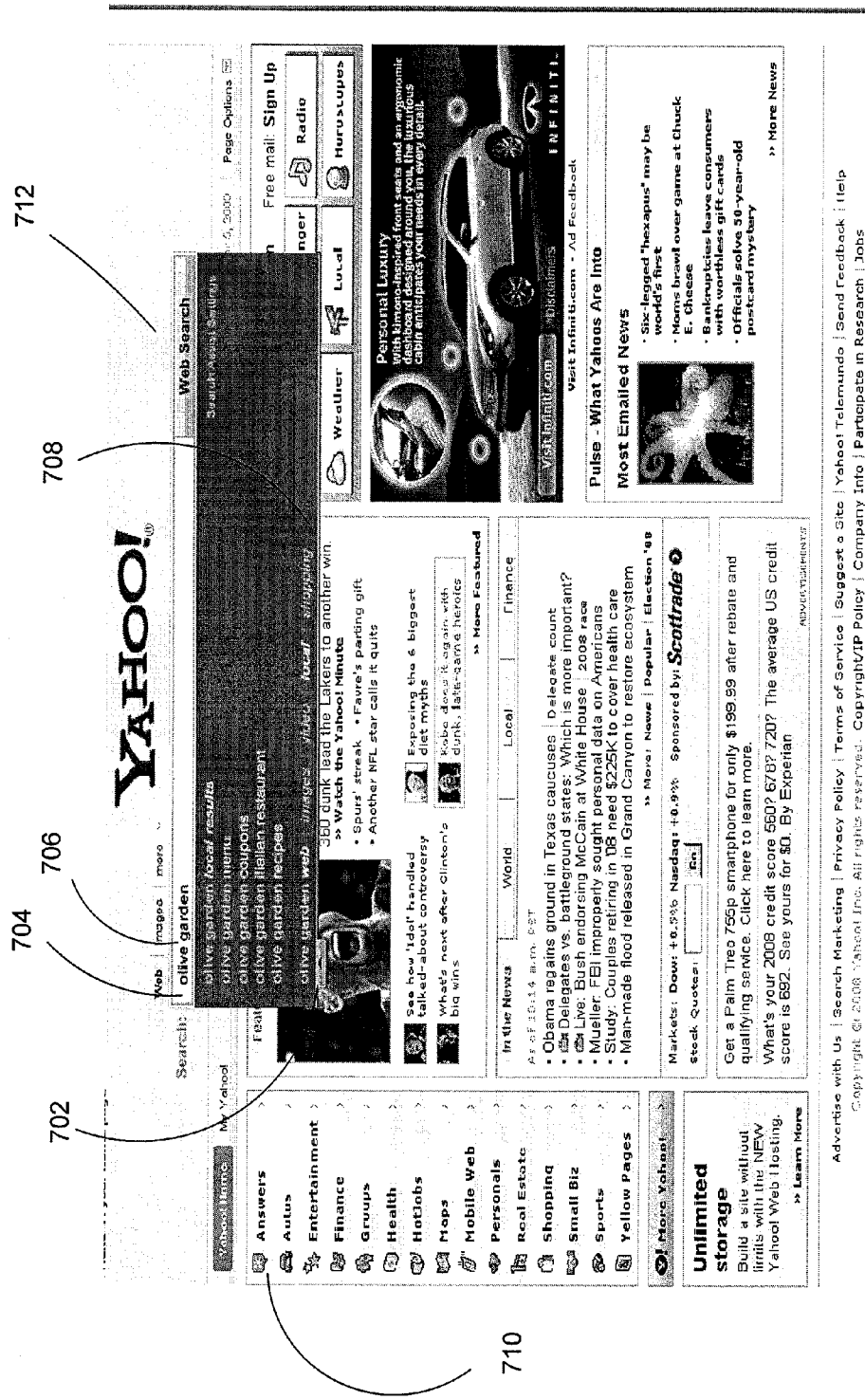
FIG. 7 is a screen diagram illustrating a search engine with a search interface component for presenting suggestions for vertical segments to the user according to one embodiment of the present invention.

FIG. 7 is a screen diagram illustrating a search engine with a search interface component for presenting suggestions of vertical segments to the user according to one embodiment of the present invention. According to the embodiment illustrated in FIG. 7, the search interface 702 may be presented to a user submitting a query 706 into the search box 704 of a search engine. As the user submits a query 706, the search interface may present suggestions of vertical segments, 708.

As mentioned above, vertical segments may include any of the segments displayed on the navigation bar 710. According to the embodiment in FIG. 7, vertical segments may include, but are not limited to, Answers, Autos, Entertainment, Finance, Groups, Health, HotJobs, Maps, Mobile Web, Personals, Real Estate, Shopping, Small Biz, Sports, and Yellow Pages. The user may decide to forego selecting a vertical segment and use the Web Search button 712 to submit the query with a mouse click. The user may also decide to select a vertical segment that produces a more responsive result set by clicking on a vertical segment of interest presented by the lower panel 708 of the search interface.

FIGS. 1 through 7 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A computerized method for assisting a user in formulating a search request through a presentation of one or more suggested search vertical segments, the method comprising:
   electronically, via a processing device, retrieving one or more terms or phrases comprising a query;
   electronically, via a processing device, receiving user specific information comprising at least one of an IP address, a geographic location, an age, a sex, a marital status, past browsing behavior, and brand loyalty associated with the user;
   electronically, via a processing device, generating one or more suggested search vertical segments based on the one or more terms or phrases and the user specific information;
   electronically, via a processing device, selecting a suggested search vertical segment from the one or more suggested search vertical segments, wherein selecting the search vertical comprises displaying the vertical segments along with one or more indices from other sources, wherein the vertical segments are ranked based on a combination of click-through rates and a conditional probability of each vertical segment; and
   electronically, via a processing device, displaying a search result to the user on the basis of the query and the selected suggested search vertical segment.

2. The method of claim 1 wherein selecting a suggested search vertical segment comprises generating one or more sub-verticals based on a group to which the user belongs or user specific information; and selecting the sub-vertical.

3. The method of claim 1 wherein generating one or more suggested search vertical segments based on the one or more terms or phrases and the user specific information comprises generating at least one persistent vertical.

4. The method of claim 1 wherein retrieving the one or more terms or phrases comprising the query further comprises:
   receiving additional input from the user as the user types;
   generating one or more additional suggested search vertical segments based on the input.

5. The method of claim 1 wherein displaying a search result to the user comprises returning one or more hyperlinks displayed as part of a search result on a client display, the one or more hyperlinks associated with the selected suggested search vertical segment.

6. The method of claim 1 wherein generating one or more suggested search vertical segments based on the one or more terms or phrases and the user specific information comprises categorizing the query based on a clustering algorithm and a classification algorithm, wherein the clustering algorithm comprises one of a K-means algorithm, a Fuzzy C-means algorithm, or a hierarchical clustering algorithm and the classification algorithm comprises using a probability score.

7. The method of claim 6 wherein the probability score comprises gathering training data and learning a function from the training data.

8. A non-transitory computer readable medium having computer readable program code embodied therein, the computer readable program code when executed by a processing device causes the processing device to perform a method comprising:
   retrieving one or more terms or phrases comprising a query;
   receiving user specific information comprising at least one of an IP address, a geographic location, an age, a sex, a marital status, past browsing behavior, and brand loyalty associated with the user;
   generating one or more suggested search vertical segments with the query based on the one or more terms or phrases and the user specific information;
   selecting a suggested search vertical segment from the one or more suggested search vertical segments, wherein selecting a suggested search vertical segment comprises displaying the vertical segments along with one or more indices from other sources, wherein the vertical segments are ranked based on a combination of click-through rates and a conditional probability of each vertical segment; and displaying a search result to the user on the basis of the query and the selected suggested search vertical segment.

9. The computer readable medium of claim 8 wherein selecting a suggested search vertical segment comprises generating one or more sub-verticals based on a group to which the user belongs or user specific information; and selecting the sub-vertical.

10. The computer readable medium of claim 8 wherein generating one or more suggested search vertical segments based on the one or more terms or phrases and the user specific information comprises generating at least one persistent vertical.

11. The computer readable medium of claim 8 wherein retrieving the one or more terms or phrases comprising the query further comprises:
    receiving additional input as the user types; and
    generating one or more additional suggested search vertical segments based on the input.

12. The computer readable medium of claim 8 wherein displaying a search result to the user comprises returning one or more hyperlinks displayed as part of a search result on a client display, the one or more hyperlinks associated with the selected suggested search vertical segment.

13. A computerized system for assisting a user in formulating a search request through presenting one or more suggested search vertical segments, the system comprising at least one processing device coupled to at least one client device over a network, the at least processing device operable at least to:
    retrieve one or more terms or phrases comprising a query;
    receive user specific information comprising at least one an IP address, a geographic location, an age, a sex, a marital status, past browsing behavior, and brand loyalty associated with the user;
    generate one or more suggested search vertical segments based on the one or more terms or phrases and the user specific information;
    select a suggested search vertical segment from the one or more suggested search vertical segments, wherein to select a suggested search vertical segment comprises displaying the vertical segments along with one or more indices from other sources, wherein the vertical segments are ranked based on a combination of click-through rates and a conditional probability of each vertical segment; and
    display a result to the user on the basis of the query and the selected suggested search vertical segment.

14. The system of claim 13 wherein to select a suggested search vertical segment comprises to generate one or more sub-verticals based on a group to which the user belongs or user specific information; and select the sub-vertical.

15. The system of claim 13 wherein to generate one or more suggested search vertical segments based on the one or more terms or phrases and the user specific information comprises to generate at least one persistent vertical.

16. The system of claim 13 wherein to retrieve one or more terms or phrases comprises to receive additional input as the user types; and to generate one or more additional suggested search vertical segments.

17. The system of claim 13 wherein the computerized system is operative to return one or more hyperlinks displayed as part of the search result on a client display, the one or more hyperlinks associated with the selected suggested search vertical segment.

* * * * *